United States Patent

Rockwell, Jr. et al.

[15] 3,641,651

[45] Feb. 15, 1972

[54] WORK POSITIONING MECHANISM

[72] Inventors: Adelbert W. Rockwell, Jr., Gloucester; Donald F. Herdeg, Beverly; Armand L. Tardiff, Salem, all of Mass.

[73] Assignee: USM Corporation, Flemington, N.J.

[22] Filed: Feb. 18, 1970

[21] Appl. No.: 12,260

[52] U.S. Cl. ........................................................29/203 B
[51] Int. Cl. ..............................................................H05k 3/30
[58] Field of Search ..........................29/203 B, 407; 90/13.4; 250/219

[56] References Cited

UNITED STATES PATENTS

2,918,835  12/1959  Watson...............................90/13.4 X
3,468,024  9/1969  Yonkers............................29/203 B X
3,532,893  10/1970  Marantette et al.................250/219 R

*Primary Examiner*—Thomas H. Eager
*Attorney*—Richard A. Wise, Richard B. Megley and Carl E. Johnson

[57] ABSTRACT

A machine is disclosed for successively positioning a workpiece such as a circuit board in predetermined relation to a tool such as an inserter according to a program dictated for instance by a template. Motors respectively drive X and Y cross slides until one sensor is aligned with a particular X-location template hole and with the corresponding Y-location holes of a particular Y-row in use in the template whereupon a sensing stylus successively engages the Y-row holes to locate the work-carrying slide in its precise predetermined operating position. Successive "Y-sweeps" in opposite directions are automatically repeated with an intervening shorter "X-sweep" in one direction after each completed Y-sweep. A fluidic system preferably, though not necessarily, controls the drive motors and hence the tool operation in programmed manner.

20 Claims, 9 Drawing Figures

WORK POSITIONING MECHANISM

BACKGROUND OF THE INVENTION

X-Y movements of a workpiece to preselected discrete positions have hitherto been effected by cross-slides manually controlled, and also by numerically controlled or programmed mechanism. The former is slow and generally unsuited to longer, more complicated industrial operations, and the latter is generally very costly and complex. Various industrial operations require the benefits of exact relative positioning of a workpiece and a device for operating thereon, yet such operations frequently need to be accomplished precisely, with at least moderate speed and without the degree of expense customarily attending tape or other program-controlled mechanism. Programmed insertion of electronic components in wiring boards is herein selected for exemplification as one field in which a novel intermediate approach can provide a fairly rapid operating rate at moderate cost when a novel uncomplicated control system, preferably fluidic, is employed as herein proposed, though it will be understood that the present invention is not thus limited in its application.

SUMMARY OF THE INVENTION

In view of the foregoing it is an object of this invention to provide an improved, relatively simple mechanism for successively positioning a workpiece accurately relative to an operating tool as dictated by a record such as a template. A further object of the invention is to provide automatic template-reading mechanism for relatively positioning a workpiece and a tool operable thereon.

Another object of the invention is to provide an X-Y cross-slide control mechanism wherein one slide is fixed when the other is successively shifted between operating positions automatically to cause a "sweep," whereupon the first slide is unlocked and predeterminately shifted to enable the other slide oppositely to sweep over an adjacent operating path.

A more specific object of this invention is to provide, for use with a component inserting machine, an improved system for programming the positioning of a circuit board relative to the operating zone of the machine, the system employing a cross-slide carriage positioned by mechanism orthogonally sensing a template.

To these ends a feature of the invention resides in providing a work and template supporting cross-slide carriage, the template bearing indicia constituting a record of desired operating positions of the work with respect to an operating tool, independently operable means for moving the respective slides of the carriage, and control mechanism for the slide moving means for locking one of the slides in successive positions along its ordinate to determine a series of operating positions along an orthogonal ordinate, the control mechanism including automatic means responsive to the template record for successively locating the other slide on its orthogonal ordinate.

It is a further feature as shown herein to provide, in an organization of the type just indicated, means in the control mechanism for unlocking the locked slide when the other slide has traversed the record along the orthogonal ordinate in one direction, means for shifting the unlocked slide to a next position along its ordinate for relocking, and means for causing said other slide thereupon reversely to sweep the orthogonal ordinate thus determined.

Still another feature resides in the provision of a fluidic control system for relatively moving the cross-slide template and work carriage relative to a sensor adapted to read the template, the system including means for more rapidly effecting the relative movements when longer inactive sweeps are indicated by the template.

BRIEF DESCRIPTION OF THE DRAWINGS

The foregoing and other features of the invention, including various novel details and combinations of parts, will now be more particularly described in connection with a component-inserting machine embodying automatic means for controlling work positioning, and with reference to the accompanying drawings thereof, in which.

DESCRIPTION OF THE PREFERRED EMBODIMENT

Figure 1:
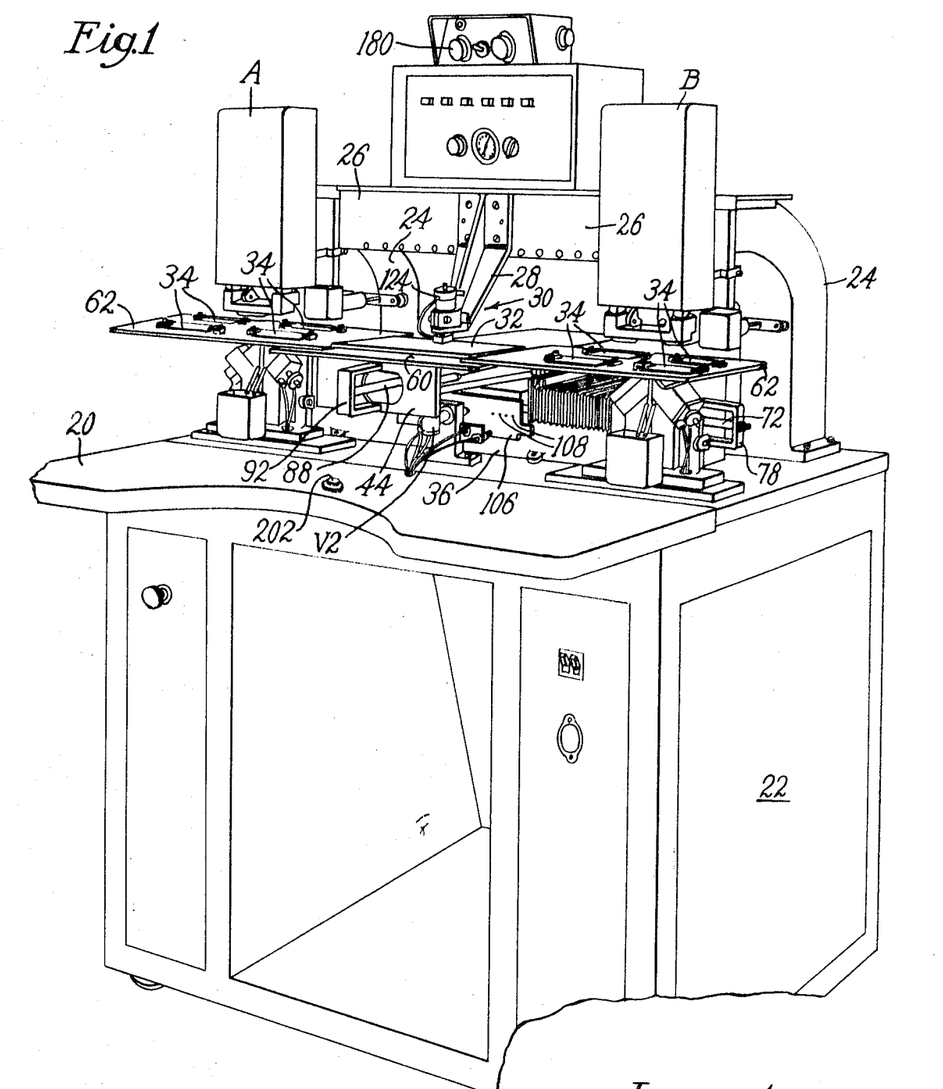
FIG. 1 is a perspective view of a fluidically controlled machine adapted for inserting components simultaneously at two stations, each station being adapted to receive a pair of right-hand circuit boards and a pair of left-hand boards.
Figure 2:
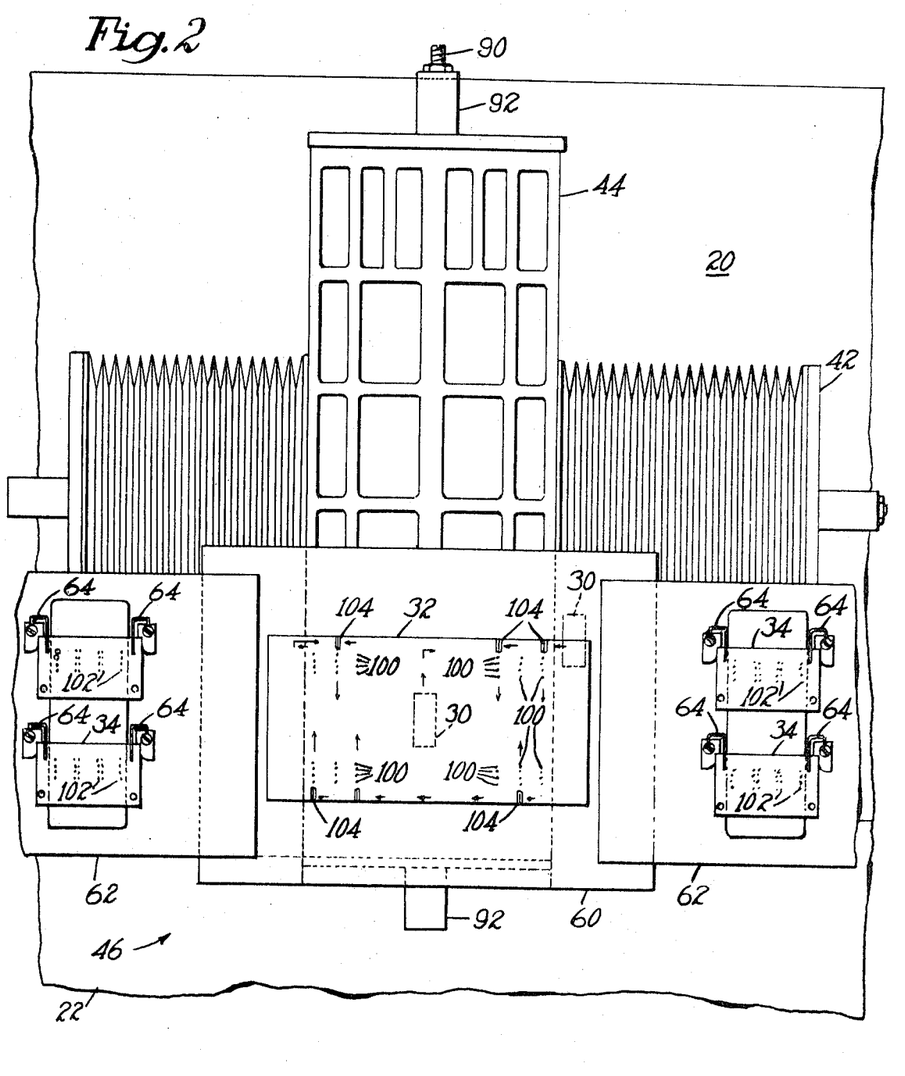
FIG. 2 is a plan view of a template and certain of the work-mounting stations on a carriage including cross-slide mechanism shown in FIG. 1, relative positions of a stylus assembly being indicated in dashed lines to indicate an upper-right starting position an a central final position.

Referring mainly to FIGS. 1 and 2, a horizontal platform 20 constituting the top of a cabinet 22 fixedly supports, by means of spaced overhanging standards 24, 24 (FIG. 1) an crossbar 26, a pair of laterally spaced component-inserting machines designated A and B and a member 28 for supporting a centrally disposed fluidic sensor assembly bearing general reference character 30 (FIGS. 1 and 3-8). It will be understood that the inserting machines A and B may be of any suitable type, for instance such as disclosed in U.S. Pat. No. 2,896,213, granted July 28, 1959 in the names of Leon Alderman et al. A back portion of the cabinet 22 encloses most of a fluidic control system hereinafter to be described for simultaneously positioning a template 32 (FIGS. 1-5) relative to the sensor 30, and at least one circuit board 34 (FIGS. 1 and 3) relative to the machines A or B. As illustrated in FIG. 2 a right-hand pair and a left-hand pair of circuit boards is mounted at each machine station, only the inner ones being shown in FIG. 2.

Figure 3:
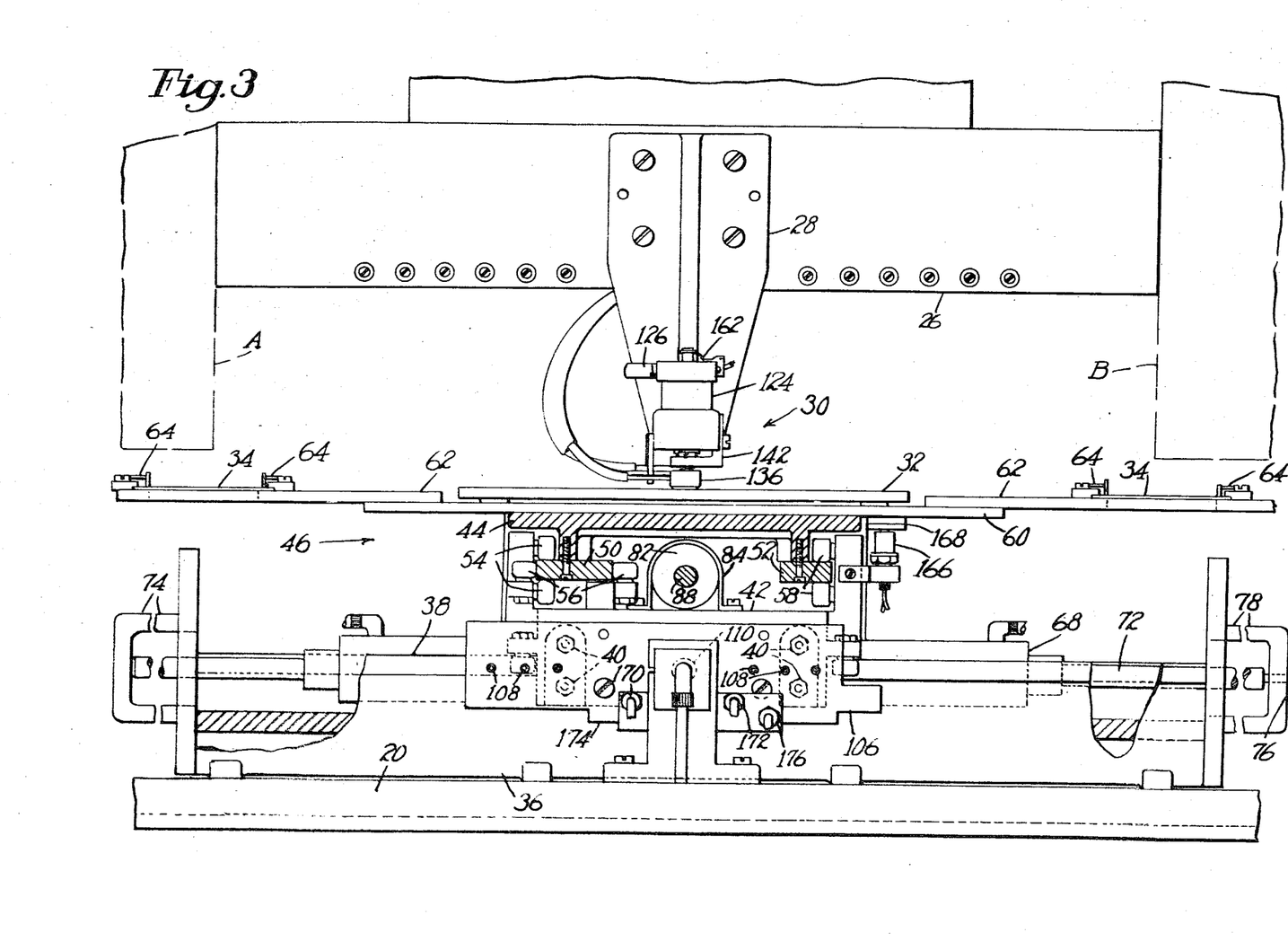
FIG. 3 is a view in front elevation largely in section of the fluidic stylus assembly and associated means seen in FIG. 1 for operating the cross-slide mechanism.
Figure 4:
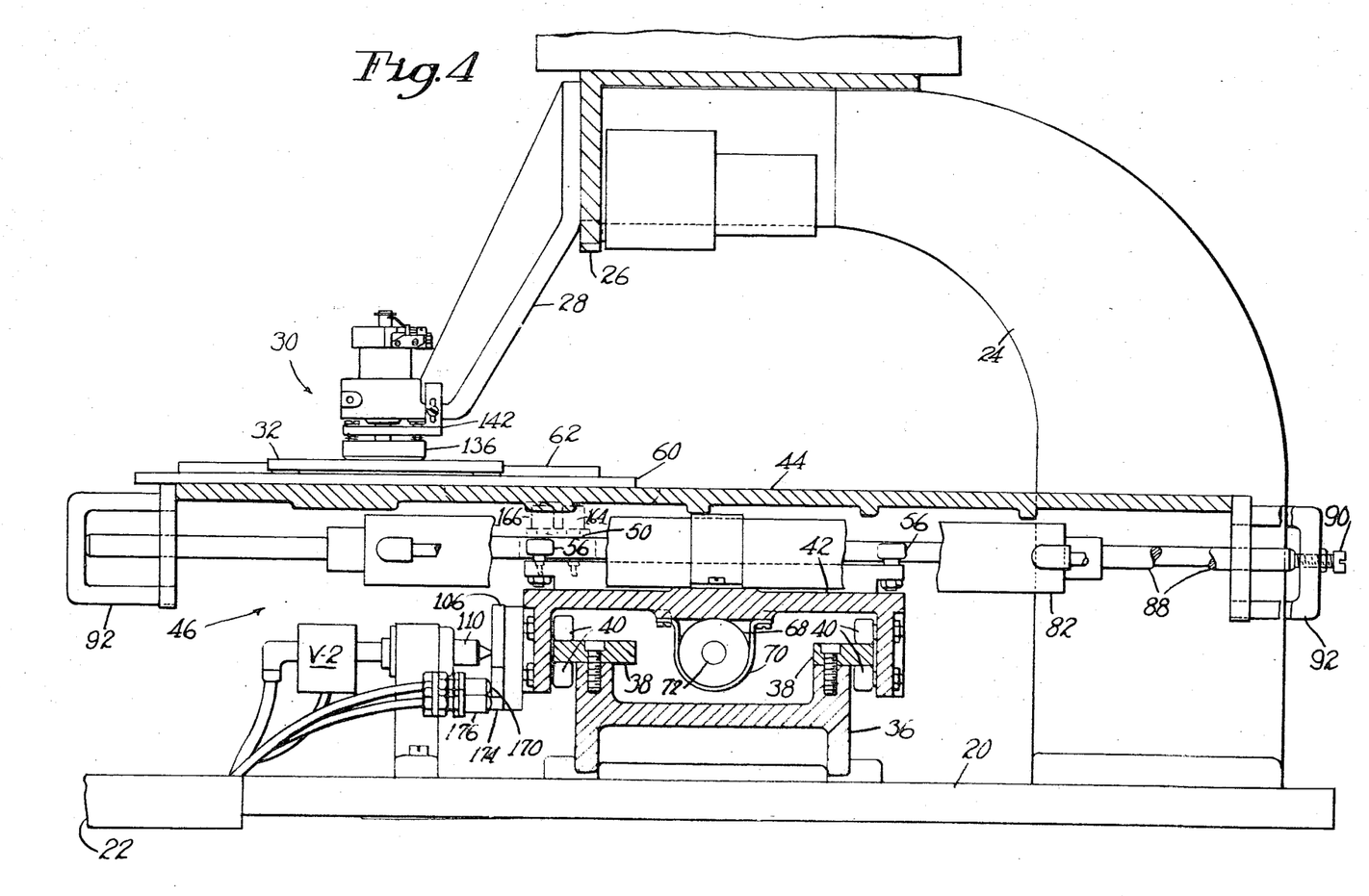
FIG. 4 is a view in side elevation of mechanism shown in FIG. 3.

As shown in FIGS. 3 and 4, anchored to the top of the platform 20 by means of a widthwise extending beam 36 are a pair of parallel rails 38, 38 engaged by cooperative rollers 40 of a U-shaped X-slide 42. This slide and a Y-slide 44 constitute a cross-slide carriage generally designated 46 for supporting and positioning the template 32 and the circuit boards 34 with respect to the sensor 30 and machines A and B as will be explained. Upper portions of the X-slide 42 have bolted thereto a pair of parallel horizontal guide rails 50, 52 (FIGS. 3 and 4) at right angles to the rails 38. The rail 50 is engaged by vertically disposed rolls 54, 54, and by horizontally disposed rolls 56; the rail 52 is engaged by a pair of rolls 58, 58, all of the rolls 54, 56 and 58 being rotatably carried by the Y-slide 44. The latter has secured thereon a mounting plate 60 detachably supporting the template 32, and preferably at either side thereof an open plate 62 to which at least one wiring board 34 is removably secured as by clips 64.

For moving the X-slide 42, as controlled by fluidic means hereinafter to be described, an air cylinder 68 is affixed to the X-slide as by a strap 70 (FIG. 4). A piston rod 72 (FIGS. 3, 4 and 9) extending axially through the cylinder 68 has one end secured in an extension 74 of the beam 36 and its other end, for purposes of axial adjustment, abuts a screw 76 threadedly received in a beam extension 78. The rod 72 has a stationary piston 80 shown only schematically in FIG. 9. For moving the Y-slide 44 a cylinder 82 (FIGS. 3, 4 and 9) is secured as by a strap 84 to the slide 42 and has an axially movable piston 86 (FIG. 9) and piston rod 88 (FIGS. 4 and 8) coupled at its ends to the Y-slide 44. The rod 88 preferably has one end adjustably connected axially as by means of a setscrew 90 (FIG. 4) threaded into one of two end extensions 92 of the Y-slide and abutting the rod 88.

Figure 5:
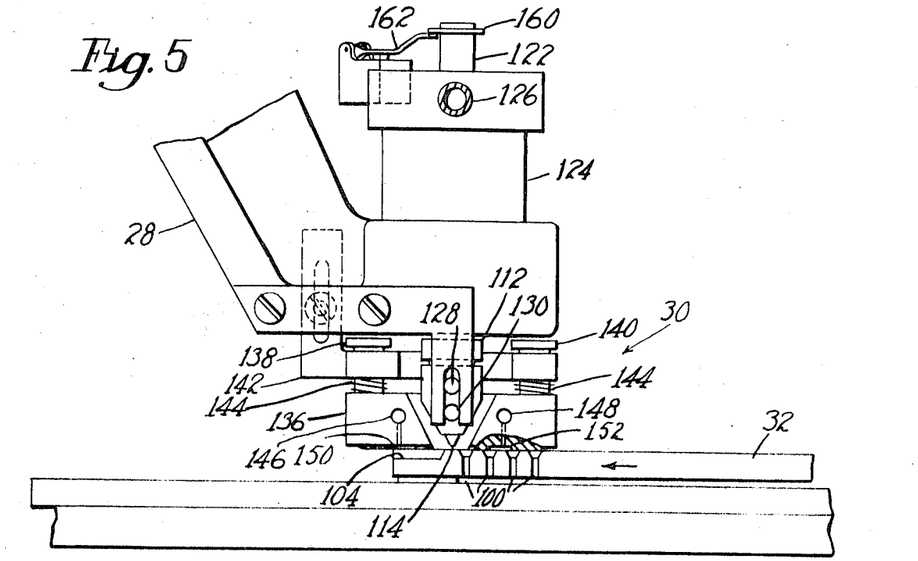
FIG. 5 is an enlarged view in side elevation, with a portion broken away, of the stylus and a template speed control sensor, the template carriage being shifted in Y direction.
Figure 6:
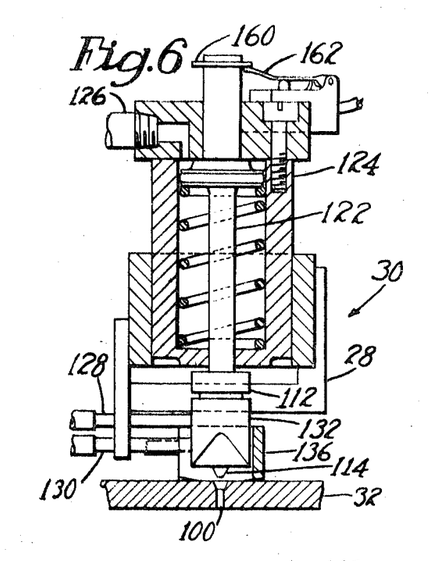
FIG. 6 is an axial section of the stylus assembly shown in FIG. 5 when looking to the left therein.
Figure 7:
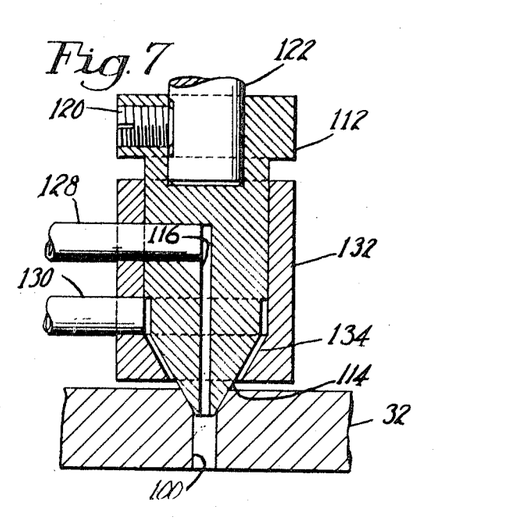
FIG. 7 is an enlarged axial section of the stylus shown in FIG. 6 when in template-engaging position.

For use with the fluidic system later to be described the template 32 is formed with indicia in the form of columnar or Y-extending rows of holes 100 (FIGS. 2, 5), usually equispaced in groups and corresponding with the localities (normally pairs of preformed lead-receiving holes 102) on each circuit board whereat an electronic component is to be inserted. For purposes later mentioned the mouths of the holes 100 are preferably conical. The template 32 is also formed with marginal notches 104 (FIGS. 2, 5) aligned with the rows of Y-holes 100 for a purpose hereinafter mentioned. A supplemental template or limit control 106 (FIGS. 3 and 4) is secured to the front of the X-slide 42 and is formed with an X-extending row of holes 108 to be followed by a locking pin 110 (FIGS. 4 and 8) substantially to register the X-position of each of the rows of template holes 100 to be found by a vertically movable stylus 112 (FIGS. 5-7). This stylus has a conical camming tip 114 for reception, upon proper signal, in an aligned one of the template holes 100, and is provided with a small axial air passage 116 (FIG. 7) for functioning as a part of the fluidic sensor assembly 30 referred to above and now to be further described.

The stylus 112 of the sensor assembly 30 is secured by a setscrew 120 (FIG. 7) to the lower end of a vertical piston rod 122 of a spring-return air motor 124 (FIGS. 1, 3, 6 and 9) bracketed to the member 28 and having an inlet 126. Air is supplied continuously, during operation, via a tube 128 to the upper end of the passage 116. Also, an air supply tube 130 (FIGS. 5-7) terminates in a tubular collar 132 mounted on the stylus 112 for vertical movement therewith and defining therewith a conical vent 134 convergent upon the exit of passage 116. The arrangement is such that the tube 128 is connected to a back-pressure switch of the Schmitt trigger type 3-9 (FIG. 9) of the fluid logic control system subsequently referred to in detail, and the tube 130 is connected through a variable orifice to a source of air pressure of about 3 p.s.i. When the template 32 exposes no hole 100 to the sensor 30 but underlies it, a small back pressure exists in the passage 116 by reason of the convergence of the airflow from the vent 134 with the flow from the passage 116. This back pressure is removed as soon as the passage 116 is reached by an edge of any hole 100 or notch 104 thereby shifting the Schmitt 3-9 trigger to "off" and, as will be explained, producing several results amongst which are stoppage of the Y-sweep of the template 32 relative to the sensor 30, lowering the stylus 112 into locking relation with the selected hole 100, and operation of the insertion heads of the machines A and B.

Figure 8:
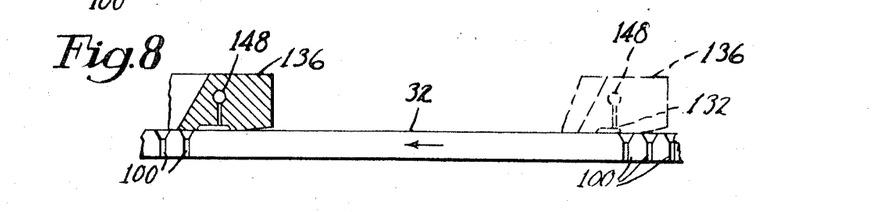
FIG. 8 is a detail view corresponding largely with a portion of FIG. 5 but illustrating template speed control mechanism.

As shown in FIG. 5 a template speed control block 136 is threadedly supported on a pair of bolts 138, 140 vertically slidable in a bracket 142 on the member 28, a spring 144 on each of the bolts yieldingly urging the block 136 downwardly against the template 32. The block 136 is provided with air passages 146, 148 respectively having elongated sensing exits 150, 152 disposed on the Y-axis. The arrangement is such that while both of the passages 146 or 148 are receiving and emitting airflow only one of them is effectively active in changing template speed along the Y-ordinate, the passage 146 and its exit 150 being adapted for speed-shifting the template 32 toward the front of the machine, and the passage 148 and its exit 152 for speed-shifting the template 32 toward the rear as illustrated in FIG. 5. The Y-length of each of the sensing exits 150, 152 is sufficient to span the mouths of two adjacent holes 10 in a Y-row group of such holes between which the template 32 would be moved the relatively short distance at only moderate speed. The arrangement is such that when the sensing exit 152, for instance, is not registering with any hole 100, a pressure signal is sent via the passage 148 to cause the template 32 to be more rapidly moved rearwardly by the air motor 82, 86 in the Y-direction, as indicated in FIG. 8, until the next Y-row hole 100 (in the right-hand group of the template 32 in FIG. 8) is reached and sensed by the exit 152 to thereupon shift the template to the slower speed preparatory to reception of the sensing stylus tip 114.

It may be noted that while certain templates 32 of selected program information or record pattern may be removably mounted to prescribe the desired sequence of component insertion for certain wiring boards, an alternate and sometimes preferable procedure is to permanently mount a "universal template," i.e., one having an indefinite number of uniformly spaced holes 100 and notches 104 in Y-columns extending throughout the entire template, and provide a series of removable template masking covers each formed with its unique "active" pattern of holes and notches coincident with certain of the holes 100 and notches 104 where components are, in fact, to be mounted, and blocking all other holes 100 and notches 104 where yet no insertion is desired or a particular Y-column is to be skipped.

When the stylus tip 114 is substantially coaxially aligned with a selected template hole 100, a signal is sent by the fluidic control system to shift a valve V-4 (FIG. 9) whereby the line 126 is pressurized to drive the rod 122 and the stylus 112 downwardly, as shown in FIG. 7. The descending tip 114 of the latter serves as a cam, if need be, more precisely to effect a final coaxial alignment with the template 32 and hence of the circuit boards 34 with the operating localities of the machines A and B. The arrangement is such that upon bottoming of the tip 114 an actuator 160 (FIGS. 5, 6 and 9) secured to the top of the rod 122 contacts a switch-operating arm 162 to energize a circuit (not shown) for initiating a component inserting and clinching cycle at the machines A and/or B. Upon completion of component insertion and clinching the fluidic control system again shifts the template along the Y-axis according to its record or information pattern, proceeding through a Y-row of holes in one direction until a template marginal edge is reached before shifting the template in an X-direction, by means next referred to, and starting a sweep in an reverse Y-direction in an adjacent row of holes 100.

For controlling the size of the field of sweep of the template with respect to the sensor 30, a spaced pair of Y-limit switches 164, 166 (one only shown in FIGS. 3 and 9) is carried by the X-slide 42 and disposed to be actuated respectively by the front and back end portion of a cam 168 (FIGS. 3, 9) secured to the Y-slide 44. Similarly, for limiting relative sweep in the X-ordinate the supplemental template 106 (FIG. 3) is of suitable width near its lower end and disposed to prevent actuation of either of a pair of X-limit switches 170, 172 (FIGS. 3, 4 and 9) until a lateral or Y-extending edge of the template 106 passes the switch 170 or 172. Additionally, as referred to later in the description of sequenced operation, the template 106 has a bottom cam projection 174 (FIGS. 3 and 4) of suitable X-length such that when it passes a speed control sensing switch 176 in right traverse the template 32 will be caused by the motor 80, 82 more rapidly to move to position the left-hand boards 34 into alignment with the respective machines A and B in order that the completed right-hand boards may be removed and other boards 34 loaded. If the operator has not actuated the reset button 202, the mechanism for traversing in the X-direction stops. On pressing the button 202 the machine is enabled to process the left-hand boards until completion whereupon, right-hand traverse of the auxiliary template 106 having passed the limit switch 170, a signal is given the fluidic system effecting rapid return traverse of the X-slide 42 to a centralized position, actuation of the reset button 202 being required fully to return the template carriage 46 to the right. Again, the reset button actuation is normally followed by operator removal of the completed boards 34 and loading of the next boards to receive components. The "start" position for the template 32 is herein arbitrarily selected as that wherein the sensor 30 is aligned with the upper right corner of that template and a theoretical "reset position" is selected as that wherein the sensor 30 is directly over a central portion of that template. Both sensor positions are indicated in dash lines in FIG. 2.

Figure 9:
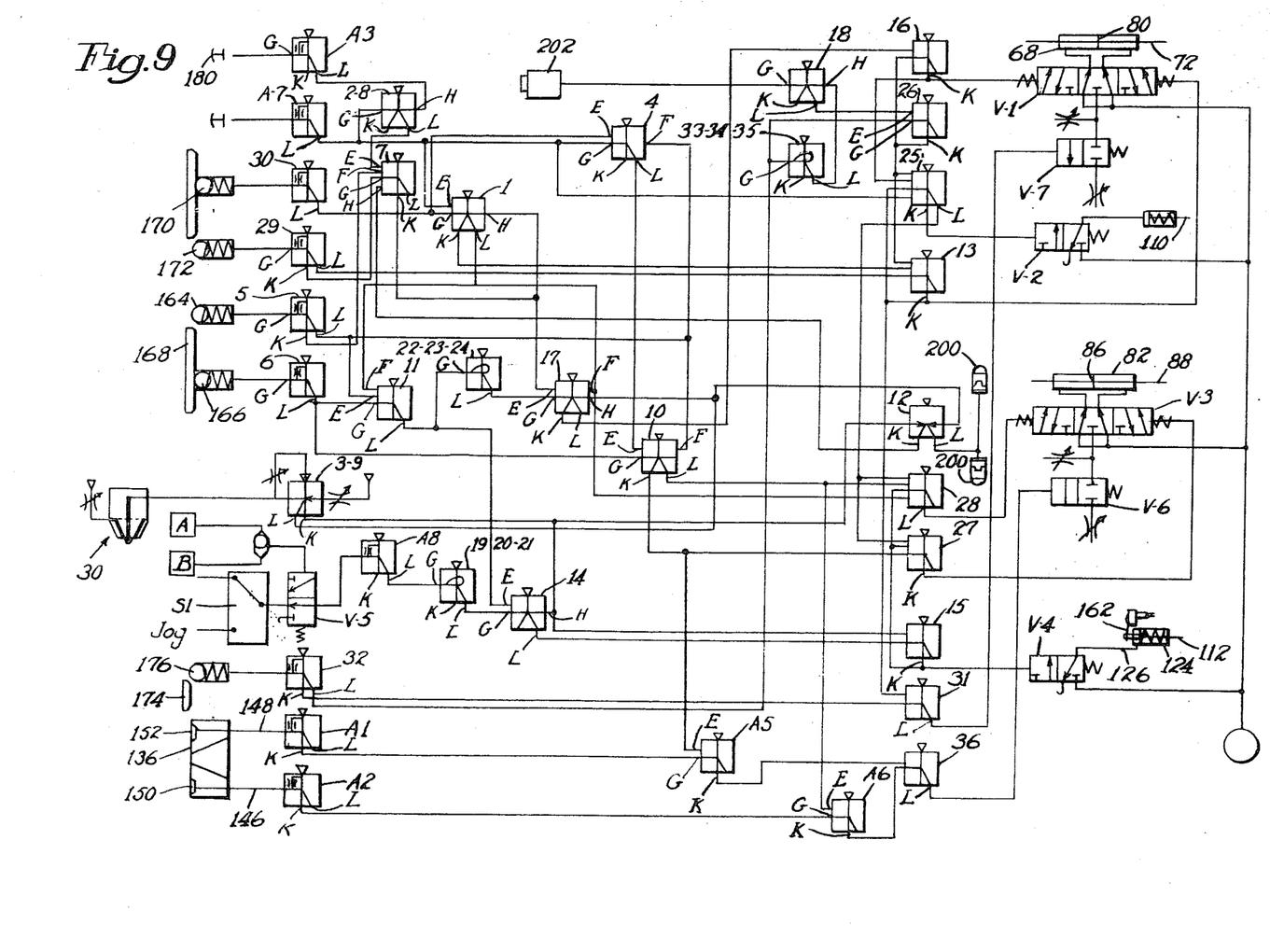
FIG. 9 is a schematic diagram of the fluidic control system.

The sequence of operations of the machine and its control system will now be reviewed having particular reference to FIG. 9 wherein inputs, outputs and vents of the respective fluid modules are lettered for identification. Where, in FIG. 9, certain of the modules are directed by two or more hyphenated numbers such as 2-8, for instance, the significance is simply that the module 2-8 has connection with accumulator outlets marked 2 and 8. In the following decimalized step description, it will be understood that consecutive numbers in the hundredths place for a series of steps indicate events or conditions transpiring simultaneously, that "N.A." means "no action," and that "C.S." means "change of state." Assuming the carriage 46 is in its starting position, the steps are:

| | |
|---|---|
| 1.00 | Load machine with selected template 32 and corresponding boards 34 |
| 2.00 | Press start button 180 (FIG. 1, 9) |
| 2.10 | A3 shifts from K to L |
| 2.20 | 2-8 shifts from L to K removing signal from 7E |
| 2.21 | If template 32 is left, no signal at 7G |
| 2.22 | If template 32 is forward, no signal at 7F |
| 2.23 | If sensor 30 is over template 32, no signal at 7H |
| 2.30 | 7 shifts from L to K |
| 2.40 | 1 shifts from L to K |
| 2.41 | Signal applied to 13 (N.A.) |
| 2.42 | Signal removed from 11F (N.A.) |
| 2.43 | Signal removed from 17F (N.A.) |
| 2.44 | Signal applied to 17E. (C.S.) |
| 2.50 | 17 shifts from K to L |
| 2.60 | 16 shifts from L to K |
| 2.70 | 25 shifts from K to L |
| 2.8 | Valve V-2 (FIGS. 4, 9) shifts retracting left-right Lockpin 110 from template 106 |
| 2.90 | Valve V-1 shifts causing template 32 to move right by means of cylinder 68. |
| 3.00 | Lockpin 110 reaches first slot 108 (FIG. 3) |
| 3.10 | 3-9 shifts from K-L |
| 3.11 | Signal applied to 17 H (C.S.) and 12 (C.S.) |
| 3.12 | 17 shifts from L TO K |
| 3.13 | 16 shifts from K to L |
| 3.14 | V-1 shifts causing template 32 to stop in register with first column-indicating notch 104 |
| 3.15 | 25 shifts L to K |
| 3.16 | V-2 shifts extending lockpin 110 to lock X-slide 42 |
| 3.17 | Signals from 25L to 27 and 28 removed |
| 3.18 | Signal removed from 14H, 15 and 12 (Note: Prior to this point 14 had signals at ports E and H, thus, the output was indeterminate. When the signal was removed from 14H the output became 14L. No change of state was noticed by 15. |
| 3.20 | When signal 25L is removed (step 3.15) 28 shift from L to K |
| 3.30 | Valve V-3 shifts moving Y-slide 44 inward by means of the piston rod 88 |
| 4.00 | Forward limit valve opens |
| 4.10 | 5 shifts from L to K |
| 4.20 | Signal removed from 4F, 10F, 11E |
| 4.30 | Signal applied to 7F |
| 4.40 | 7 shifts from K to 1 |
| 4.50 | 11 shifts from L to K |
| 4.60 | Signal removed from 14E, 22G |
| 5.00 | As template 32 moves, the sensor "reaches" the end of slot 104 and 3-9 shifts from L to K |
| 5.10 | Signal applied to 14H, 15, and 12 signal removed from 17H, and 12. |
| 5.11 | 14 shifts from L TO K removing signal from 15. |
| 5.12 | 12 shifts K-L, indicator lights 200 (FIG. 9) come on |
| 5.13 | No change at 17 |
| 6.00 | Sensor 30 "reaches" hole 100. |
| 6.10 | 3-9 shifts from K-L |
| 6.11 | Signal removed from 14H (N.A.), 12 (C.S.) and 15 (C.S.) |
| 6.12 | Signal applied to valve V-4 (Stylus tip 114 extends) |
| 6.13 | Signal applied to 27 (N.A.) and 28 (C.S.) |
| 6.14 | Signal removed from V-3 (template 32 stops) |
| 7.00 | When stylus tip 114 extends the limit switch 162 is activated which in turn initiates the insertion cycle at machines A, B. |
| 8.00 | During the insertion cycle, pilot pressure is applied to V-5, which allows the trigger of A-8 to vent. |
| 8.10 | A-8 shifts from L to K. |
| 8.20 | Signal removed from 19G (N.A. one-shot resets internally). |
| 9.00 | At completion of insertion cycle pilot pressure is removed from V-5. Note: If S-1 is in ON position plugged line will cause pressure in trigger line shift A-8. If S-1 is OFF line will vent until jog button is pressed. |
| 9.10 | A-8 shifts from K to L |
| 9.11 | Signal at 19G causes one shot to shift from K to L momentarily. |
| 9.12 | Pulse at 14G (C.S.) |
| 9.13 | Signal from 14 L to 15 (C.S.) |
| 9.14 | Signal removed from V-4 (stylus tip 114 retracts up) |
| 9.15 | Signal removed from 27 (N.A.) and 28 (C.S.) |
| 9.16 | Signal to V-3 causes template 32 to move rearward. |
| 9.17 | As sensor 30 moves "away" from hole, 3-9 shifts from L TO K. |
| 10.00 | Cycle repeats from 5.1 |
| HIGH SPEED on Y-ordinate | |
| 11.00 | As template 32 moves rearward, sensor 150 (FIGS. 5, 9) passes over holes 100 ahead of stylus sensor tip 114. |
| 11.10 | If no hole is under sensor 150, A2 will shift from K to L removing signal from A6. |
| 11.11 | If template 32 is moving rearward, 10L will be off—10K on. |
| 11.12 | A6 K will signal 36 (C.S.) |
| 11.13 | Signal applied to valve V-6 increasing exhaust flow, Y-slide 44 moves at higher speed. |
| 11.14 | When sensor 150 passes over next hole 100, A2 shifts to K |
| 11.15 | A6 shifts to L |
| 11.16 | 36 shifts to K |
| 11.17 | V-6 closes its exhaust to V-3 and template 32 moves at low speed. Note: If template 32 is moving forward 10 K will be off and 10 L on. A6 will be held at K and sensor 152 may operate A5 through A1. Thus, the template 32 speed is always controlled by the sensor 150 or 152 which is leading the stylus. The template 32 will move rearward with continued steps from 5.1–10.0 until sensor switch 166 is released which causes 6 to shift from K to L |
| 12.00 | Signal from 6L to 11G (C.S.) and 14E (N.A.) |
| 12.10 | Signal from 22-24 one-shot (momentarily) to 17G (C.S.) |
| 12.11 | Signal removed from 16 (C.S.) |
| 12.12 | Signal from 16K to V-1, and 25 (C.S.) |
| 12.13 | Signal from 25L to 27 N.A. and 28 (C.S.) |
| 12.14 | Template 32 stops moving rearward. |
| 12.15 | Return to step 2.8–3.18 |
| 12.16 | When signal 25L is removed (3.15), 27 shifts from L to K |
| 13.00 | Rear limit valve opens |
| 13.11 | shifts from L to K |
| 13.12 | Signal removed from 10E (N.A.), 11G (C.S.) |
| 13.13 | Return to step 4.5–11.17 |
| 13.14 | The template 32 will move forwardly with continued steps 5.1–10.0 until sensor switch 164 is released which causes r to shift from K to L |
| 14.00 | Signal removed from 7F (N.A.) |
| 14.10 | Signal applied to 4F (N.A.) |
| 14.11 | Signal applied to 10F (C.S.) |
| 14.12 | Signal applied to 11E (C.S.) |
| 14.13 | Signal applied to 14E (N.A.) |
| 14.14 | Return to step 12.11–12.13 |
| 14.15 | Signal from 25L to 27 (C.S.) and 28 (N.A.) |
| 14.16 | Template 32 stops moving forward. |
| 14.17 | Return to 2.8–14.17. Cycle continues until all components have been inserted. |
| 15.00 | After last component of board 34 has been installed, template 32 will move right at step 2.9. |
| 15.15 | Signal removed from 33 G (N.A. internal reset) 26G (if there is a signal at 26E N.A., if no signal at 26E C.S.) Note: A reset pulse button 202 (FIGS. 1, 9) is located in the front table of the machine and must be pressed by the operator after the completed boards 34 have been replaced with empty boards. The operator may change boards in one side of the fixture while the machine is operating on the other boards. If the button has been actuated before the cam reaches sensor 176, there will be no stop in the cycle. If not, the cycle will pause until the button 202 has been pressed. |
| 15.16 | Pressing pulse button 202 will cause 18 to shift from K to L applying signal 26E. |
| 15.17 | If 26 changes from L to K |
| 15.18 | Signal applied to 16 (C.S.), 25 (N.A.) and 13 (N.A.) |
| 15.19 | Signal removed from V-1 |
| 15.20 | Template 32 stops. |
| 16.00 | Step 15.16 |
| 16.10 | 26 changes from K to L |
| 16.11 | Signal removed from 16 (C.S.) 25 (N.A.) and 13 (N.A.) |
| 16.12 | System returns to condition of 15.15 |

| | |
|---|---|
| 17.00 | Sensor switch 176 is released. |
| 17.10 | 32 shifts from K to L. |
| 17.20 | Signal removed from 31. |
| 17.30 | Signal removed from V-7 |
| 17.40 | V-7 closes. Table moves at low speed. |
| 17.50 | Signal applied to 26G (N.A.) and 33G C.S. momentarily pulse to 18H (C.S.) |
| 17.60 | 18 changes from L to K |
| 17.70 | Signal removed from 26E (N.A.) |
| 17.80 | Cycle continues at 3.00-15.00 |
| 18.00 | Sensor A is released. |
| 18.10 | 30 shifts from K to L |
| 18.20 | Signal applied to 1G (C.S.) and 4E (If table is at out limit N.A., if not C.S.) |
| 18.30 | 1 shifts from K to L |
| 18.31 | Signal removed from 13 (C.S.) |
| 18.32 | Signal applied to 11F (N.A.), 17F (N.A.) and 28 (N.A.) |
| 18.40 | 13 shifts from L to K |
| 18.41 | Signal applied to 25 (N.A.), 31 (C.S.) |
| 18.42 | V-1 shifts and table moves left |
| 18.43 | 31 shift from K to L |
| 18.44 | V-7 opens, table moves at high speed. |
| 19.00 | Sensor C actuated |
| 19.10 | 32 shifts from L to K |
| 19.20 | Signal applied to 31 (N.A.) |
| 19.30 | Return to step 15.15-17.70 |
| 19.40 | Cycle continues at 18.44 |
| 20.00 | B is released |
| 20.10 | 29 shifts from K to L |
| 20.11 | Signal applied to 13 (C.S.) |
| 20.12 | Signal removed from 7G (Refer to 18.20) |
| 20.13 | 13 shifts from K to L |
| 20.14 | Signal removed from V-1, 31 (C.S.) and 25 |
| 20.15 | Template 32 stops |
| 20.20 | Cycle restarts at 2.21 and will continue. |

While the template and the workpiece are herein disclosed as being movable, respectively, to the sensor and the operating tool, it will be apparent that it is within the scope of this invention to make the sensor and the operating tool relatively movable with respect to a stationary template and stationary workpiece, respectively. Also, while a fluidic control system is described herein, it will be apparent that a comparable electrical system may be employed. Having eliminated the need for costly servo positioning mechanism, the invention nevertheless provides highly accurate means for programming operating positions of the work with respect to the tool, at a moderate cost, and in a manner to insure a good production rate.

Having thus described our invention, what we claim as new and desire to secure by Letters Patent of the United States is:

1. In a machine for successively positioning a workpiece relative to a tool according to register of successive indicia in a template with a sensor, the sensor being adapted to automatically actuate the tool in response to such register, a carriage mounted on cross-slides for positioning the template in unison with the work, motor means for moving the cross-slides independently of one another on X and Y ordinates, respectively, and a control system including the sensor for operating the motor means to cause the X-slide to index on the X-ordinate in steps corresponding to the spacing of a plurality of aligned indicia in the template, the sensor being effective when the X-slide has indexed, to signal the control system and cause the Y-slide to register successive template indicia with the sensor.

2. A machine as set forth in claim 1 wherein the control system is one employing a fluidic logic network.

3. In a machine having a cross-slide carriage for moving a workpiece and a template relative to a tool and a sensor respectively, the template being formed with holes for indicating successive localities of operation of the tool on the workpiece, the sensor having a plunger responsive to registry with the respective template holes for effecting operation of the tool, mechanism for moving the carriage, and a control system for said mechanism and including the sensor to cause the holes of the template in predetermined order to register with the sensor.

4. In a machine as set forth in claim 3 wherein the carriage-moving mechanism comprises independently operable motor means operatively connected to each of the carriage slides, and the control system includes means for holding one of the motor means inoperative while the other is operative to cause the holes in one of several parallel rows in the template and the workpiece relatively to transverse the sensor and the tool respectively, in one direction, means responsive to completion of said transverse for rendering one motor means operative to shift the template to align an adjacent row of template holes with the sensor, and means thereupon operative to render the one motor means inoperative and effect traverse of said adjacent row of holes relative to the sensor.

5. A machine as set forth in claim 3 wherein the plunger serves as a sensor in said control system for stopping the carriage-moving mechanism when a template hole approaches axial alignment with the plunger, said plunger being formed with a sensing air vent.

6. A machine as set forth in claim 5 wherein the control system employs a fluidic network including means providing an airflow convergent with said sensing air vent adjacent to a face of the template for signaling of the stopping of the carriage in alignment with the plunger.

7. A machine as set forth in claim 5 wherein a template speed control block is provided with sensing vents on opposite sides of said sensing vent, each of said speed control sensing vents extending more than the spacing between two regularly spaced holes of the template, the arrangement being such that the speed control sensing vent leading the sensing vent is effectively operative in said control system when not exposed to any portion of a template hole to signal for more rapid traverse of the template until said leading vent is so exposed.

8. In a machine having an X-Y slide carriage supporting a template and at least one workpiece in relatively movable relation, respectively, to a sensor cooperative with the template and a tool operative on the workpiece, the template having indicia susceptible to being sensed by the sensor and arranged to correspond with operating localities of the tool on the workpiece, mechanism for moving the X-slide in the X-direction, independently operable mechanism for moving the Y-slide in the Y-direction, and control means for holding one of the x and y slide-moving mechanism locked against operation while the other of said mechanisms causes its driven slide to progress between limits over successive positions in a row wherein aligned template indicia register with the sensor, said control means including circuit means responsive to one of said limits to render the mechanism for the driven slide inoperative and the mechanism driving the locked slide is rendered operative to align an adjacent row of template indicia with the sensor, the control means further including means thereupon operative to relock the previously locked slide and reversely operate said driven slide.

9. In a machine having a carriage for coordinate moving of a workpiece and a template relative to a tool and a sensor, respectively, the template being formed with columnar indicia arranged in one direction and marginal records in register with the respective columnar indicia, power means for moving the carriage in X and Y directions, and a control system for said power means to cause the template columnar indicia of successive columns to move in one of said directions for register with the sensor, said system being responsive to completion of a sweep of one column with respect to the sensor to shift registry of the temple marginal record with an adjacent column and then effect a sweep in the reverse direction of said adjacent column.

10. In a machine having a cross-slide carriage for programming the successive operating positions of a workpiece relative to a tool in accordance with relative positioning of a sensor and a template, the template having at least on row of holes for respectively cooperating with the sensor, independent power mechanism associated with the respective X and Y cross-slides of said carriage, and a control system for said mechanism and including said sensor to hold one cross-slide stationary while the other is moved to shift the holes of the template row relative to the sensor, said sensor being adapted to sense each hole to stop said other slide in register therewith, and the sensor being responsive to the template hole in register therewith to signal for the operation of said tool.

11. A machine as set forth in claim 10 wherein the control system employs fluidic logic, the sensor is an air-emitting stylus projectable into the mouths of said holes on substantial register therewith, and other air-emitting means adjacent to the stylus is adapted to change speed of one of the cross-slides in response to nonregistry of a template hole with said other air-emitting means.

12. In a machine for mounting components on a workpiece in predetermined rows extending along Y-axis directions in accordance with correspondingly spaced holes formed in a template,
   a sensor,
   an X-cross slide indexable substantially in accordance with the spacing between the template Y-rows of holes,
   a Y-cross slide independently movably mounted on the X-slide and adapted to carry the template and the workpiece, respectively, relative to the sensor and a component inserting machine,
   fluid-operated mechanism for operating the X-slide between its successive indexed positions,
   other fluid-operated mechanism for reversibly operating the Y-slide when the X-slide is in an indexed position to cause a leading edge of each successive Y-row hole to be sensed by the sensor,
   said sensor being formed with an air-emitting vent for signaling for the stopping of said other fluid operated mechanism when the leading edge of a Y-row hole is sensed,
   and circuit means responsive to the operation of said sensor for locking the Y-slide in fixed position and actuating the component inserting machine.

13. In a machine for moving a workpiece relatively to a tool in accordance with a predetermined order of tool operations,
   a movable carriage for supporting the workpiece and a main template formed with holes, said carriage including independently movable X and Y cross-slides,
   a sensor immovable in the X and Y directions and responsive to the leading edge of each main template hole coming into register therewith for rendering the Y-slide inoperative and the tool operative,
   independently operable mechanism for moving the X and Y slides to shift the main template holes with respect to the sensor,
   a control system for said mechanisms, and
   an auxiliary template carried by the X-slide and having a series of indexing stops spaced in the Y-direction to correspond, respectively, with rows of the main template holes disposed in the Y-direction,
   said control system being adapted to register successive Y-row holes with the sensor while the X-slide is rendered inoperative on being indexed at an auxiliary template stop.

14. A machine as set forth in claim 13 wherein the control system includes means automatically operable, when no further holes in a given Y-row of the main template remain to be sensed by the sensor, to index the auxiliary template and enable the adjacent Y-row of holes successively to be sensed by the sensor.

15. A machine as set forth in claim 13 wherein the sensor includes a reciprocable stylus having a conical tip receivable in the main template holes, said indexing stops of the auxiliary template being designed to allow a small play in the X cross-slide whereby the stylus tip can overrule the auxiliary template in camming the main template on entering a hole thus to finally and precisely locate the main template and hence the workpiece.

16. A machine as set forth in claim 13 wherein the mechanism for moving the X and Y cross-slides is fluid operated and said control system is fluidic, said sensor being operatively connected to the control system by means including a Schmitt trigger.

17. A machine as set forth in claim 13 wherein the auxiliary template includes cam means cooperative with switches of the control system for limiting transverse in the X-direction of the X cross-slide.

18. A machine as set forth in claim 13 wherein the auxiliary template includes cam means cooperative with switches of the control system for changing speed of traverse of the X cross-slide.

19. A machine as set forth in claim 13 wherein the mechanism for moving the X and Y cross-slides is fluid operated, and the sensor is operatively connected to the control system and has a movable stylus formed with an air-emitting vent with respect to which the main template holes may be coaxially registered in succession, the arrangement being such that the registration of a hole with the stylus vent causes the workpiece and the template to be cammed to a stationary position by the stylus.

20. A machine as set forth in claim 13 wherein the mechanism for moving the X and Y cross-slides in fluid operated, the sensor is operatively connected to the control system and includes a camming stylus having an air-emitting vent, and a pair of change speed sensing vents leading and lagging the air-emitting vent in the Y-direction, respectively, the speed sensing vents being adapted to span only relatively closely disposed adjacent holes in a Y-row whereby the leading vent, on failure of a Y-row template hole to register therewith, signals the control system to cause said mechanism to move the Y-slide more rapidly until a Y-row hole is sensed by said leading vent.

* * * * *